US010174795B2

(12) United States Patent
Azumai

(10) Patent No.: US 10,174,795 B2
(45) Date of Patent: Jan. 8, 2019

(54) SPEED CHANGE DEVICE

(71) Applicant: AISIN AW CO., LTD., Anjo-shi, Aichi-ken (JP)

(72) Inventor: Takahiro Azumai, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 206 days.

(21) Appl. No.: 15/124,258

(22) PCT Filed: Mar. 20, 2015

(86) PCT No.: PCT/JP2015/058421
§ 371 (c)(1),
(2) Date: Sep. 7, 2016

(87) PCT Pub. No.: WO2015/151851
PCT Pub. Date: Oct. 8, 2015

(65) Prior Publication Data
US 2017/0016490 A1 Jan. 19, 2017

(30) Foreign Application Priority Data

Mar. 31, 2014 (JP) .................................. 2014-072052

(51) Int. Cl.
*F16H 45/02* (2006.01)
*F16D 25/12* (2006.01)
(Continued)

(52) U.S. Cl.
CPC ........... *F16D 25/10* (2013.01); *F16D 13/385* (2013.01); *F16D 13/52* (2013.01); *F16D 13/76* (2013.01);
(Continued)

(58) Field of Classification Search
CPC ........ F16D 25/10; F16D 25/123; F16D 25/12; F16D 13/76; F16D 13/52; F16D 25/0638;
(Continued)

(56) References Cited

U.S. PATENT DOCUMENTS 9,719,562 B2 * 8/2017 Azumai .................. F16D 21/06
9,719,579 B2 * 8/2017 Torii ....................... F16H 3/663
9,958,018 B2 * 5/2018 Azumai .................. F16D 21/06

FOREIGN PATENT DOCUMENTS

| JP | H08-277852 A | 10/1996 |
| JP | 2011-012736 A | 1/2011 |

(Continued)

OTHER PUBLICATIONS

Jun. 23, 2015 International Search Report issued in Patent Application No. PCT/JP2015/058421.

*Primary Examiner* — Ramya P Burgess
*Assistant Examiner* — Lillian T Nguyen
(74) *Attorney, Agent, or Firm* — Oliff PLC

(57) ABSTRACT

A speed change device that includes a first clutch that has a first piston, a first engagement oil chamber, and a first centrifugal hydraulic pressure cancellation chamber configured to cancel a centrifugal hydraulic pressure generated in the first engagement oil chamber; a second clutch that has a second piston, a second engagement oil chamber, and a second centrifugal hydraulic pressure cancellation chamber configured to cancel a centrifugal hydraulic pressure generated in the second engagement oil chamber and that is disposed around the first clutch; and a drum member that defines the first engagement oil chamber together with the first piston and that defines the second engagement oil chamber together with the second piston.

20 Claims, 6 Drawing Sheets

(51) Int. Cl.
*F16D 25/10* (2006.01)
*F16H 3/66* (2006.01)
*F16D 13/38* (2006.01)
*F16D 13/52* (2006.01)
*F16D 21/00* (2006.01)
*F16D 25/0638* (2006.01)
*F16D 13/76* (2006.01)
*F16D 48/02* (2006.01)
*F16D 121/04* (2012.01)

(52) U.S. Cl.
CPC ......... *F16D 21/00* (2013.01); *F16D 25/0638* (2013.01); *F16D 25/12* (2013.01); *F16D 25/123* (2013.01); *F16H 3/66* (2013.01); *F16H 3/663* (2013.01); *F16H 3/666* (2013.01); *F16D 2048/0224* (2013.01); *F16D 2121/04* (2013.01); *F16D 2300/00* (2013.01); *F16H 45/02* (2013.01); *F16H 2200/006* (2013.01); *F16H 2200/0086* (2013.01); *F16H 2200/2007* (2013.01); *F16H 2200/2023* (2013.01); *F16H 2200/2046* (2013.01); *F16H 2200/2082* (2013.01); *F16H 2200/2097* (2013.01)

(58) Field of Classification Search
CPC ......... F16D 2048/0224; F16D 2300/00; F16D 2121/04; F16D 2200/006; F16H 45/02; F16H 3/666; F16H 3/66; F16H 2200/00–2200/2097
See application file for complete search history.

(56) References Cited

FOREIGN PATENT DOCUMENTS

| | | |
|---|---|---|
| JP | 2013-155849 A | 8/2013 |
| WO | 2008/102886 A1 | 8/2008 |
| WO | 2008/102887 A1 | 8/2008 |
| WO | 2010/021152 A1 | 2/2010 |
| WO | WO-2014178351 A1 * 11/2014 ........... F16D 13/683 |

* cited by examiner

FIG. 2

|   |      | C-1 | C-2 | C-3 | C-4 | B-1 | B-2 | F-1 |
|---|------|-----|-----|-----|-----|-----|-----|-----|
| D | 1st  | ○   |     |     |     |     | ●   | ○   |
|   | 2nd  | ○   |     |     |     | ○   |     |     |
|   | 3rd  | ○   |     | ○   |     |     |     |     |
|   | 4th  | ○   |     |     | ○   |     |     |     |
|   | 5th  | ○   | ○   |     |     |     |     |     |
|   | 6th  |     | ○   |     | ○   |     |     |     |
|   | 7th  |     | ○   | ○   |     |     |     |     |
|   | 8th  |     | ○   |     |     |     ○   |     |
| REV1 |    |     |     | ○   |     |     | ○   |     |
| REV2 |    |     |     |     | ○   |     | ○   |     |

※○: ENGAGED,
●: ENGAGED WITH ENGINE BRAKE IN OPERATION

SPEED CHANGE DEVICE

BACKGROUND

The present disclosure relates to a speed change device that includes a first clutch and a second clutch disposed around the first clutch.

There has hitherto been known a speed change device that includes a clutch C3 constituted as a multi-plate friction hydraulic clutch and a clutch C4 constituted as a multi-plate friction hydraulic clutch and disposed on the inner side of the clutch C3 (see Japanese Patent Application Publication No. 2013-155849, for example). The clutches C3 and C4 of the speed change device share a drum member that includes an inner drum and an outer drum that has a base end portion welded to the outer periphery of a sidewall portion of the inner drum. The inner drum of the drum member has an inner tubular portion that supports a piston of the clutch C4 and a cancel plate that defines a centrifugal hydraulic pressure cancellation chamber together with the piston, an annular sidewall portion extended radially outward from one end of the inner tubular portion, and a short cylindrical fixation portion extended from the sidewall portion on the inner side with respect to a joint portion with the outer drum. A cancel plate of the clutch C3 is fastened to the fixation portion of the inner drum via a rivet together with a clutch drum of the clutch C4. The cancel plate defines a centrifugal hydraulic pressure cancellation chamber of the clutch C3 on the radially outer side with respect to the centrifugal hydraulic pressure cancellation chamber of the clutch C4. Further, the drum member has a cancellation chamber oil hole formed in the inner tubular portion of the inner drum so as to communicate with the centrifugal hydraulic pressure cancellation chamber of the clutch C4, and a cancellation chamber oil passage that extends in the radial direction to communicate with the centrifugal hydraulic pressure cancellation chamber of the clutch C4. The cancellation chamber oil hole and the cancellation chamber oil passage communicate with each other via a recessed portion formed in the inner peripheral surface of the inner tubular portion of the inner drum. The recessed portion communicates with a working oil supply oil passage provided inside the inner tubular portion. Consequently, in the speed change device, working oil from the working oil supply oil passage is allocated by the recessed portion to be supplied to the centrifugal hydraulic pressure cancellation chamber of the clutch C4 and the centrifugal hydraulic pressure cancellation chamber of the clutch C3.

SUMMARY

In the case where working oil is supplied from the common recessed portion to both the centrifugal hydraulic pressure cancellation chamber of the clutch C4 and the centrifugal hydraulic pressure cancellation chamber of the clutch C3 which is disposed around the clutch C4 as in the speed change device according to the related art described above, the zero base point of the centrifugal hydraulic pressure is common to the centrifugal hydraulic pressure cancellation chambers on the inner and outer sides, and the performance for canceling the centrifugal hydraulic pressure in the two centrifugal hydraulic pressure cancellation chambers may not be secured adequately. In the case where the cancel performance for one of the centrifugal hydraulic pressure cancellation chambers is insufficient, for example, it is necessary to enhance the rigidity of a return spring disposed between the piston and the cancel plate. Accordingly, a hydraulic pressure to be supplied to an engagement oil chamber to engage the clutch must be enhanced, which may degrade the fuel efficiency of a vehicle on which the speed change device is mounted.

An exemplary aspect of the present disclosure provides a speed change device that includes a first clutch and a second clutch disposed around the first clutch, in which the degree of freedom in adjusting the cancel performance for a first centrifugal hydraulic pressure cancellation chamber of a first clutch on the inner side and the cancel performance for a second centrifugal hydraulic pressure cancellation chamber of a second clutch on the outer side is improved.

The present disclosure according to an exemplary aspect provides a speed change device that includes a first clutch that has a first piston, a first engagement oil chamber, and a first centrifugal hydraulic pressure cancellation chamber configured to cancel a centrifugal hydraulic pressure generated in the first engagement oil chamber, and a second clutch that has a second piston, a second engagement oil chamber, and a second centrifugal hydraulic pressure cancellation chamber configured to cancel a centrifugal hydraulic pressure generated in the second engagement oil chamber and that is disposed around the first clutch; and a drum member that defines the first engagement oil chamber together with the first piston and that defines the second engagement oil chamber together with the second piston. The drum member has an inner tubular portion that supports the first piston and a cancellation chamber defining member that defines the first centrifugal hydraulic pressure cancellation chamber together with the first piston, a cancellation chamber oil hole formed in the inner tubular portion so as to communicate with the first centrifugal hydraulic pressure cancellation chamber, and a cancellation chamber oil passage that communicates with the second centrifugal hydraulic pressure cancellation chamber; and a first cancellation chamber recessed portion that communicates with the cancellation chamber oil hole to supply cancellation oil to the cancellation chamber oil hole and a second cancellation chamber recessed portion that communicates with the cancellation chamber oil passage to supply the cancellation oil to the cancellation chamber oil passage are formed in an inner peripheral surface of the inner tubular portion of the drum member at intervals in a circumferential direction.

Consequently, by independently providing the inner peripheral surface of the inner tubular portion of the drum member with the first cancellation chamber recessed portion which communicates with the cancellation chamber oil hole and the second cancellation chamber recessed portion which communicates with the cancellation chamber oil passage, the zero base point of the centrifugal hydraulic pressure can be set independently for the first centrifugal hydraulic pressure cancellation chamber and the second centrifugal hydraulic pressure cancellation chamber. As a result, with the speed change device, the degree of freedom in adjusting the cancel performance for the first centrifugal hydraulic pressure cancellation chamber of the first clutch on the inner side and the cancel performance for the second centrifugal hydraulic pressure cancellation chamber of the second clutch on the outer side can be improved.

BRIEF DESCRIPTION OF THE DRAWINGS

FIG. 2 is an operation table illustrating the relationship between each shift speed of the automatic transmission which is included in the power transfer device of FIG. 1 and the respective operating states of clutches and brakes.

DETAILED DESCRIPTION OF EMBODIMENTS

Now, an embodiment of the present disclosure will be described with reference to the drawings.

Figure 1:
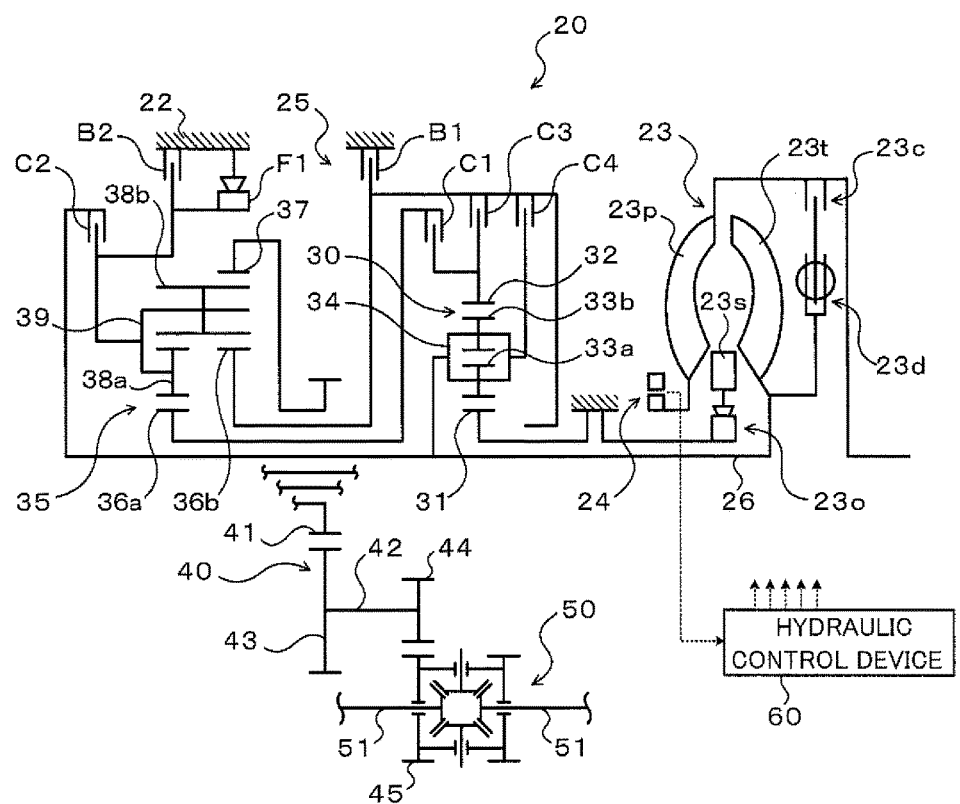
FIG. 1 is a schematic configuration diagram of a power transfer device that includes an automatic transmission that serves as a speed change device according to the present disclosure.

FIG. 1 is a schematic configuration diagram of a power transfer device 20 that includes an automatic transmission 25 that serves as a speed change device according to the present disclosure. The power transfer device 20 illustrated in the drawing is connected to a crankshaft of an engine (not illustrated) mounted on a front-drive vehicle, and can transfer power from the engine to left and right drive wheels (front wheels) (not illustrated). As illustrated in the drawing, the power transfer device 20 includes a transmission case 22 made of an aluminum alloy, for example, a starting device (fluid transmission apparatus) 23 housed inside the transmission case 22, an oil pump 24, an automatic transmission 25, a gear mechanism (gear train) 40, a differential gear (differential mechanism) 50, a hydraulic control device 60 attached to the transmission case 22, and so forth.

The starting device 23 which is included in the power transfer device 20 is structured as a torque converter that has: a pump impeller 23p on the input side connected to the crankshaft of the engine; a turbine runner 23t on the output side connected to an input shaft (input member) 26 of the automatic transmission 25; a stator 23s disposed on the inner side of the pump impeller 23p and the turbine runner 23t to rectify a flow of working oil from the turbine runner 23t to the pump impeller 23p; a one-way clutch 23o that restricts the rotational direction of the stator 23s to one direction; a lock-up clutch 23c; a damper mechanism 23d; and so forth. It should be noted, however, that the starting device 23 may be structured as a fluid coupling that does not include the stator 23s.

The oil pump 24 is constituted as a gear pump that has: a pump assembly that includes a pump body and a pump cover; an externally toothed gear connected to the pump impeller 23p of the starting device 23 via a hub; an internally toothed gear meshed with the externally toothed gear; and so forth. The oil pump 24 is driven by power from the engine to suction working oil (ATF) stored in an oil pan (not illustrated) and pump the working oil to the hydraulic control device 60 which generates a hydraulic pressure required by the starting device 23 and the automatic transmission 25.

The automatic transmission 25 is structured as an eight-speed transmission. As illustrated in FIG. 1, the automatic transmission 25 includes, in addition to the input shaft 26, a double-pinion type first planetary gear mechanism 30, a Ravigneaux type second planetary gear mechanism 35, and four clutches C1, C2, C3, and C4, two brakes B1 and B2, and a one-way clutch F1 configured to change a power transfer path from the input side to the output side.

The first planetary gear mechanism 30 of the automatic transmission 25 has: a sun gear 31 which is an externally toothed gear; a ring gear 32 which is an internally toothed gear disposed concentrically with the sun gear 31; and a planetary carrier 34 that rotatably and revolvably holds a plurality of sets of two pinion gears 33a and 33b meshed with each other, one of the pinion gears 33a and 33b being meshed with the sun gear 31 and the other being meshed with the ring gear 32. As illustrated in the drawing, the sun gear 31 of the first planetary gear mechanism 30 is fixed to the transmission case 22, and the planetary carrier 34 of the first planetary gear mechanism 30 is coupled so as to be rotatable together with the input shaft 26. The first planetary gear mechanism 30 is structured as a so-called speed reduction gear, and reduces the speed of power transferred to the planetary carrier 34 which serves as an input element to output the power from the ring gear 32 which serves as an output element.

The second planetary gear mechanism 35 of the automatic transmission 25 has: a first sun gear 36a and a second sun gear 36b which are each an externally toothed gear; a ring gear 37 which is an internally toothed gear disposed concentrically with the first and second sun gears 36a and 36b; a plurality of short pinion gears 38a meshed with the first sun gear 36a; a plurality of long pinion gears 38b meshed with the second sun gear 36b and the plurality of short pinion gears 38a and meshed with the ring gear 37; and a planetary carrier 39 that rotatably and revolvably holds the plurality of short pinion gears 38a and the plurality of long pinion gears 38b. The ring gear 37 of the second planetary gear mechanism 35 functions as an output member of the automatic transmission 25. Power transferred from the input shaft 26 to the ring gear 37 is transferred to the left and right drive wheels via the gear mechanism 40, the differential gear 50, and a drive shaft 51. In addition, the planetary carrier 39 is supported by the transmission case 22 via the one-way clutch F1. The rotational direction of the planetary carrier 39 is restricted to one direction by the one-way clutch F1.

The clutch C1 is a multi-plate friction-type hydraulic clutch (friction engagement element) that has a hydraulic servo structured from a piston, a plurality of friction plates and separator plates, an oil chamber supplied with working oil, and so forth, and that is capable of connecting and disconnecting the ring gear 32 of the first planetary gear mechanism 30 and the first sun gear 36a of the second planetary gear mechanism 35 to and from each other. The clutch C2 is a multi-plate friction-type hydraulic clutch that has a hydraulic servo structured from a piston, a plurality of friction plates and separator plates, an oil chamber supplied with working oil, and so forth, and that is capable of connecting and disconnecting the input shaft 26 and the planetary carrier 39 of the second planetary gear mechanism 35 to and from each other.

The clutch C3 is a multi-plate friction-type hydraulic clutch that has a hydraulic servo structured from a piston, a plurality of friction plates and separator plates, an oil chamber supplied with working oil, and so forth, and that is capable of connecting and disconnecting the ring gear 32 of the first planetary gear mechanism 30 and the second sun gear 36b of the second planetary gear mechanism 35 to and from each other. The clutch C4 is a multi-plate friction-type hydraulic clutch that has a hydraulic servo structured from a piston, a plurality of friction plates and separator plates, an oil chamber supplied with working oil, and so forth, and that is capable of connecting and disconnecting the planetary carrier 34 of the first planetary gear mechanism 30 and the second sun gear 36b of the second planetary gear mechanism 35 to and from each other.

The brake B1 is a multi-plate friction-type hydraulic brake that has a hydraulic servo structured from a plurality of friction plates and separator plates, an oil chamber supplied with working oil, and so forth, and that is capable of making the second sun gear 36b of the second planetary gear mechanism 35 stationary and rotatable with respect to the transmission case 22. The brake B2 is a multi-plate friction-type hydraulic brake that has a hydraulic servo structured from a plurality of friction plates and separator plates, an oil chamber supplied with working oil, and so forth, and that is capable of making the planetary carrier 39 of the second planetary gear mechanism 35 stationary and rotatable with respect to the transmission case 22.

In addition, the one-way clutch F1 includes an inner race coupled (fixed) to the planetary carrier 39 of the second planetary gear mechanism 35, an outer race, a plurality of sprags, a plurality of springs (plate springs), a retainer, and so forth. The one-way clutch F1 transfers torque via the sprags when the outer race is rotated in one direction with respect to the inner race, and allows the inner race and the outer race to rotate relative to each other when the outer race is rotated in the other direction with respect to the inner race. It should be noted, however, that the one-way clutch F1 may be of a roller type or the like, other than the sprag type.

The clutches C1 to C4 and the brakes B1 and B2 operate with working oil supplied thereto and discharged therefrom by the hydraulic control device 60 described above. FIG. 2 is an operation table illustrating the relationship between each shift speed of the automatic transmission 25 and the respective operating states of the clutches C1 to C4, the brakes B1 and B2, and the one-way clutch F1. The automatic transmission 25 provides first to eighth forward speeds and first and second reverse speeds when the clutches C1 to C4 and the brakes B1 and B2 are brought into the respective states illustrated in the operation table of FIG. 2. At least one of the clutches C1 to C4 and the brake B2, which does not include the brake B1, may be a meshing engagement element such as a dog clutch.

The gear mechanism 40 has: a counter drive gear 41 coupled to the ring gear 37 of the second planetary gear mechanism 35 of the automatic transmission 25; a counter driven gear 43 fixed to a counter shaft 42 that extends in parallel with the input shaft 26 of the automatic transmission 25 and meshed with the counter drive gear 41; a drive pinion gear (final drive gear) 44 integrally formed on (or fixed to) the counter shaft 42 away from the counter driven gear 43 in the axial direction; and a differential ring gear (final driven gear) 45 meshed with the drive pinion gear 44 and coupled to the differential gear 50.

Figure 3:
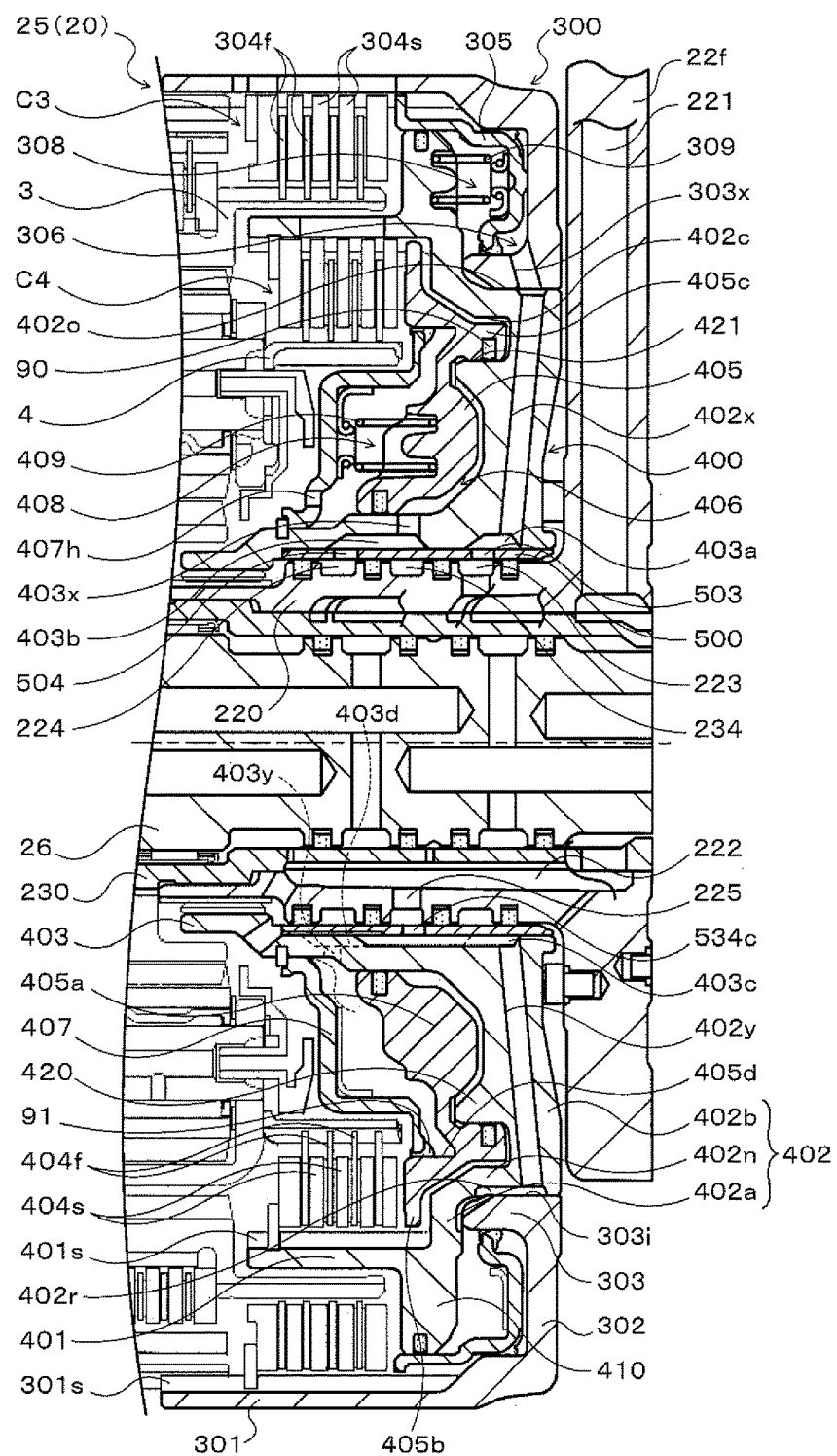
FIG. 3 is an enlarged sectional view illustrating an essential portion of the speed change device according to the present disclosure.

FIG. 3 is an enlarged sectional view illustrating an essential portion of the power transfer device 20. The drawing illustrates components around the clutches C3 and C4 which are included in the automatic transmission 25 of the power transfer device 20. As illustrated in the drawing, the clutch C3 (second clutch) which fastens the ring gear 32 of the first planetary gear mechanism 30 and the second sun gear 36b of the second planetary gear mechanism 35 to each other is disposed around the clutch C4 (first clutch) which fastens the planetary carrier 34 of the first planetary gear mechanism 30 and the second sun gear 36b of the second planetary gear mechanism 35 to each other.

The clutch C3 includes: a clutch hub (second clutch hub) 3; a plurality of friction plates (second friction engagement plates) 304f, the inner peripheral portion of which is fitted with the clutch hub 3; a clutch drum (second clutch drum) 300; a plurality of separator plates (second friction engagement plates) 304s, the outer peripheral portion of which is fitted with the clutch drum 300; and a piston (second piston) 305 that presses the friction plates 304f and the separator plates 304s into friction engagement with each other. The clutch hub 3 is integrated with (coupled to) the ring gear 32 of the first planetary gear mechanism 30 which serves as a power input member, and rotated together with the ring gear 32. The clutch drum 300 is coupled to the second sun gear 36b of the second planetary gear mechanism 35 which serves as a power output member (power transfer target), and rotated together with the second sun gear 36b. The friction plates 304f which are fitted with the clutch hub 3 are each an annular member on both surfaces of which a friction member is affixed. The separator plates 304s which are fitted with the clutch drum 300 are each an annular member, both surfaces of which are formed to be smooth.

Figure 4:
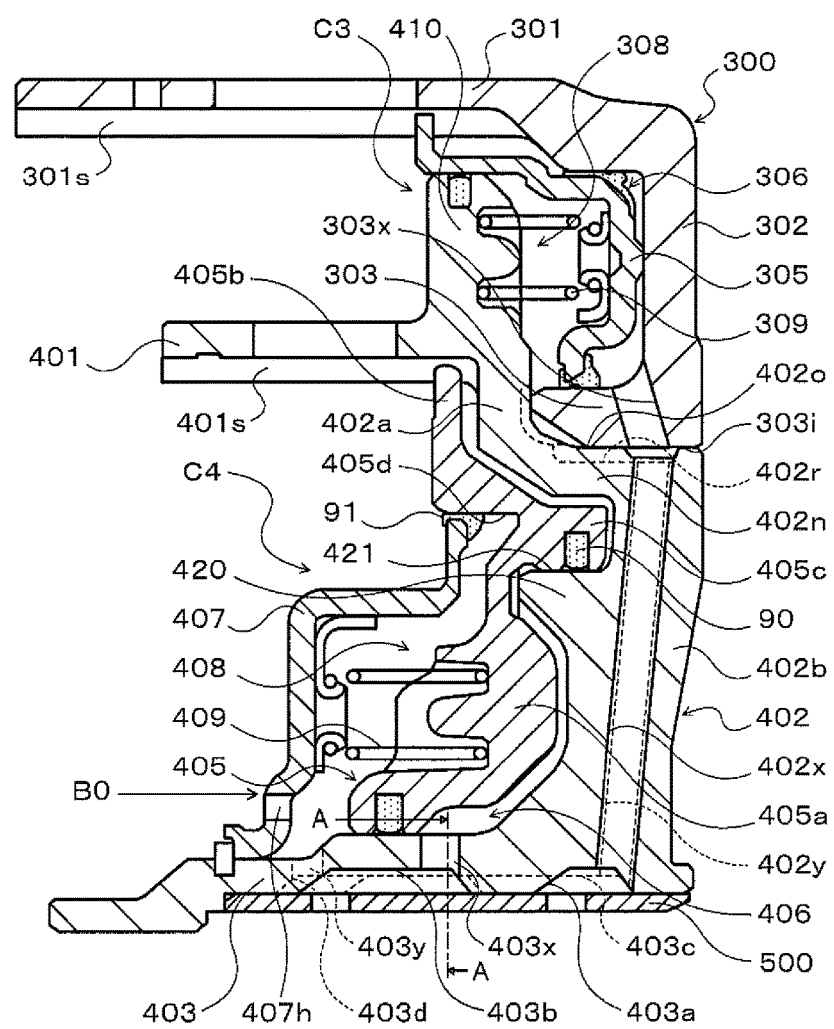
FIG. 4 is an enlarged sectional view illustrating an essential portion of the speed change device according to the present disclosure.

As illustrated in FIGS. 3 and 4, the clutch drum 300 of the clutch C3 includes: a generally cylindrical outer tubular portion 301 (second outer tubular portion) that extends in the axial direction of the clutch drum 300 (automatic transmission 25) and that is coupled to the second sun gear 36b of the second planetary gear mechanism 35 via a coupling member (not illustrated); a generally annular, annular wall portion (second annular wall portion) 302 extended inward from the base end (right end in FIGS. 3 and 4) of the outer tubular portion 301; and a generally cylindrical inner tubular portion 303 (second inner tubular portion) that is extended in the same direction as (coaxially with) the outer tubular portion 301 from the inner peripheral portion of the annular wall portion 302 so as to be positioned on the inner side of the outer tubular portion 301 and that extends in the axial direction of the clutch drum 300. The outer tubular portion 301, the annular wall portion 302, and the inner tubular portion 303 are integrally formed by casting an aluminum alloy or the like, for example. The annular wall portion 302 extends in the radial direction between the base end of the outer tubular portion 301 and the base end of the inner tubular portion 303. In the clutch drum 300 thus configured, the outer tubular portion 301 on the outer side and the inner tubular portion 303 on the inner side each function as a rib. Thus, the strength of the clutch drum 300 can be improved well.

Splines 301s that can engage with recessed/projected portions formed at the outer peripheral portion of the separator plates 304s are formed on the inner peripheral surface of the outer tubular portion 301 of the clutch drum 300. The plurality of separator plates 304s are fitted with the splines 301s of the outer tubular portion 301 so as to be arranged alternately with the plurality of friction plates 304f which are fitted with the clutch hub 3. In addition, a backing plate is fitted with the splines 301s of the outer tubular portion 301 so as to be able to abut against the friction plate 304f which is disposed closest to the first and second planetary gear mechanisms 30 and 35 side (on the left side in FIG. 3). The backing plate is supported in the axial direction by a snap ring mounted to the outer tubular portion 301.

The inner tubular portion 303 is formed to be shorter than the outer tubular portion 301. The piston 305 is supported by the outer peripheral surface of the inner tubular portion 303 and the inner peripheral surface of the outer tubular portion 301, which surrounds the inner tubular portion 303, so as to be movable in the axial direction. In the embodiment, recessed/projected portions that can engage with the splines 301s of the outer tubular portion 301 are formed at the outer peripheral portion of a pressing portion of the piston 305 which abuts against the separator plate 304s which is positioned closest to the engine side (right side in FIG. 3), so that the piston 305 is also guided by the splines 301s. In addition, a seal member is disposed between the piston 305 and the outer peripheral surface of the inner tubular portion 303 and between the piston 305 and the inner peripheral surface of the outer tubular portion 301, and an engagement oil chamber (second engagement oil chamber) 306 supplied with working oil (an engagement hydraulic pressure) for engaging the clutch C3 is defined between the annular wall portion 302 of the clutch drum 300 and the back surface of the piston 305. That is, in the clutch C3, the engagement oil chamber 306 is defined by the clutch drum 300 and the piston 305. Further, as illustrated in FIGS. 3 and 4, a plurality of oil holes (through holes) 303x that communicate with the engagement oil chamber 306 are formed in the inner tubular portion 303 at intervals in the circumferential direction.

The clutch C4 has a clutch hub (first clutch hub) 4; a plurality of friction plates (first friction engagement plates) 404f, the inner peripheral portion of which is fitted with the clutch hub 4; a clutch drum (first clutch drum) 400; a plurality of separator plates (first friction engagement plates) 404s, the outer peripheral portion of which is fitted with the clutch drum 400; and a piston (first piston) 405 that presses the friction plates 404f and the separator plates 404s into friction engagement with each other. The clutch hub 4 is integrated with (coupled to) the planetary carrier 34 of the first planetary gear mechanism 30 which serves as a power input member, and rotated together with the planetary carrier 34. The clutch drum 400 is coupled (fixed) to the second sun gear 36b of the second planetary gear mechanism 35 which serves as a power output member (power transfer target), and rotated together with the second sun gear 36b. The friction plates 404f which are fitted with the clutch hub 4 are each an annular member on both surfaces of which a friction member is affixed. The separator plates 404s which are fitted with the clutch drum 400 are each an annular member, both surfaces of which are formed to be smooth.

As illustrated in FIGS. 3 and 4, the clutch drum 400 of the clutch C4 includes: a generally cylindrical outer tubular portion 401 (first outer tubular portion) that extends in the axial direction of the clutch drum 400 (automatic transmission 25); a generally annular, annular wall portion (first annular wall portion) 402 extended inward from one end of the outer tubular portion 401; and a generally cylindrical inner tubular portion 403 (first inner tubular portion or inner tubular portion) that is extended in the same direction as (coaxially with) the outer tubular portion 401 from the inner peripheral portion of the annular wall portion 402 so as to be positioned on the inner side of the outer tubular portion 401 and that extends in the axial direction of the clutch drum 400. The outer tubular portion 401, the annular wall portion 402, and the inner tubular portion 403 are integrally formed by casting an aluminum alloy or the like, for example. The annular wall portion 402 extends radially inward between the base end of the outer tubular portion 401 and the base end of the inner tubular portion 403.

In addition, a sleeve 500 made of iron is fitted (press-fitted) into the inner tubular portion 403 of the clutch drum 400. A tubular portion 220 of an annular front support (support portion on the front side) 22f made of an aluminum alloy, for example, is fitted into the sleeve 500. The front support 22f is fixed to the transmission case 22 which houses the clutches C3 and C4, and constitutes a part of the transmission case 22. Consequently, the clutch drum 400, that is, the inner tubular portion 403, is rotatably supported by the front support 22f, that is, the transmission case 22. A stator shaft 230 coupled to the stator 23s of the starting device 23 (torque converter) via the one-way clutch 23o is unrotatably coupled (fixed) to the tubular portion 220 of the front support 22f.

Splines 401s that can engage with recessed/projected portions formed at the outer peripheral portion of the separator plates 404s are formed on the inner peripheral surface of the outer tubular portion 401 of the clutch drum 400. The plurality of separator plates 404s are fitted with the splines 401s of the outer tubular portion 401 so as to be arranged alternately with the plurality of friction plates 404f which are fitted with the clutch hub 4. In addition, a backing plate is fitted with the splines 401s of the outer tubular portion 401 so as to be able to abut against the friction plate 404f which is disposed closest to the first and second planetary gear mechanisms 30 and 35 side (on the left side in FIG. 3). The backing plate is supported in the axial direction by a snap ring mounted to the outer tubular portion 401.

The annular wall portion 402 of the clutch drum 400 includes: an outer wall portion 402a extended toward the inner tubular portion 403 (inward) from the base end of the outer tubular portion 401; and an inner wall portion 402b offset in the direction away from the outer tubular portion 401 with respect to the outer wall portion 402a and positioned on the engine side with respect to the outer wall portion 402a (on the opposite side from the free end portion of the clutch drum 400, that is, on the right side in FIG. 3) to extend between the outer wall portion 402a and the inner tubular portion 403. Consequently, the annular wall portion 402 is provided with a reduced diameter portion 402n having an outer peripheral surface 402o reduced in diameter compared to the outer peripheral surface of the outer tubular portion 401 and positioned on the opposite side of the outer wall portion 402a from the outer tubular portion 401.

In addition, the annular wall portion 402 (inner wall portion 402b) of the clutch drum 400 has: an intermediate tubular portion 420 formed in proximity to the inner tubular portion 403 compared to the outer peripheral surface 402o of the reduced diameter portion 402n so as to extend toward the piston 405 (leftward in FIGS. 3 and 4); and an annular recessed portion 402c formed to be dented outward (rightward in FIGS. 3 and 4) from the inner surface of the inner wall portion 402b between the outer peripheral surface 402o of the reduced diameter portion 402n and the intermediate tubular portion 420 in the radial direction. The inner tubular portion 403 of the clutch drum 400 is formed to be longer than the outer tubular portion 401. The piston 405 is supported by the outer peripheral surface of the inner tubular portion 403 so as to be movable in the axial direction.

The piston 405 of the clutch C4 has: a pressure receiving portion 405a movably supported by the outer peripheral surface of the inner tubular portion 403; a pressing portion 405b extended from the outer peripheral portion of the pressure receiving portion 405a to abut against the separator plate 404s which is positioned closest to the engine side (right side in the drawing); a cylindrical extended portion 405c extended from the outer peripheral portion of the pressure receiving portion 405a toward the opposite side of the pressing portion 405b; and a recessed circular columnar surface 405d that extends toward the opposite side of the extended portion 405c on the radially outer side with respect to the inner peripheral surface of the extended portion 405c. Recessed/projected portions that can engage with the splines 401s of the outer tubular portion 401 of the clutch drum 400 are formed at the outer peripheral portion of the pressing portion 405b. Consequently, the piston 405 is also guided by the splines 401s. In addition, the extended portion 405c of the piston 405 is inserted (fitted) into the annular recessed portion 402c which is formed in the annular wall portion 402 of the clutch drum 400, and the inner peripheral surface of the extended portion 405c is in sliding contact with an outer peripheral surface (circular columnar surface) 421 of the intermediate tubular portion 420 which defines the annular recessed portion 402c.

A seal member such as a D-ring or an O-ring is disposed between the pressure receiving portion 405a of the piston 405 and the outer peripheral surface of the inner tubular portion 403. A seal member 90 such as a D-ring or an O-ring is disposed between the inner peripheral surface of the extended portion 405c of the piston 405 and the outer peripheral surface 421 of the intermediate tubular portion 420. Consequently, an engagement oil chamber (first engagement oil chamber) 406 supplied with working oil (an engagement hydraulic pressure) for engaging the clutch C4 is defined between the annular wall portion 402 (inner wall portion 402b) of the clutch drum 400 and the back surface of the pressure receiving portion 405a of the piston 405 and on the radially inner side with respect to the outer peripheral surface of the extended portion 405c. That is, in the automatic transmission 25, the engagement oil chamber 406 is defined by the clutch drum 400 and the piston 405 on the radially inner side with respect to the engagement oil chamber 306 of the clutch C3.

Further, the inner tubular portion 403 of the clutch drum 400 supports a cancel plate 407 so as to rotate together therewith and be positioned on the side of the first and second planetary gear mechanisms 30 and 35 (left side in FIGS. 3 and 4) with respect to the piston 405. The inner peripheral portion of the cancel plate 407 is supported in the axial direction by a snap ring mounted to the inner tubular portion 403. In addition, a lip seal (seal member) 91 is mounted to the outer peripheral portion of the cancel plate 407, and the seal member 91 is in sliding contact with the recessed circular columnar surface 405d which is formed on the piston 405. Consequently, the cancel plate 407 defines a centrifugal hydraulic pressure cancellation chamber (first centrifugal hydraulic pressure cancellation chamber) 408 configured to cancel a centrifugal hydraulic pressure generated in the engagement oil chamber 406 together with the piston 405. Further, a plurality of return springs 409 are disposed between the piston 405 and the cancel plate 407.

The clutch drum 300 of the clutch C3 which is disposed around the clutch C4 configured as discussed above is fixed to the outer peripheral surface of the clutch drum 400 of the clutch C4 so as to surround at least a part of the outer tubular portion 401. That is, the inner tubular portion 303 of the clutch drum 300 is fitted with the reduced diameter portion 402n of the clutch drum 400 such that the distal end of the inner tubular portion 303 abuts against the back surface of the outer wall portion 402a of the clutch drum 400 (annular wall portion 402), and an inner peripheral surface 303i of the inner tubular portion 303 is joined to the outer peripheral surface 402o of the reduced diameter portion 402n by welding (e.g. electron beam welding or laser welding). Consequently, the clutch drums 300 and 400 constitute a single drum member that defines the engagement oil chamber 306 of the clutch C3 together with the piston 305 and that defines the engagement oil chamber 406 of the clutch C4 on the radially outer side with respect to the engagement oil chamber 306 together with the piston 405.

As a result, it is possible to further improve the strength of joint between the clutch drums 300 and 400 by sufficiently securing the axial length of the inner tubular portion 303 (inner peripheral surface 303i) and the reduced diameter portion 402n (outer peripheral surface 402o) of the clutch drum 400, that is, the length of joint between the inner tubular portion 303 and the clutch drum 400, even if a joint portion between the inner tubular portion 303 and the clutch drum 400 is provided toward the inner peripheral side while improving the strength of the clutch drum 300 well by causing the outer tubular portion 301 on the outer side and the inner tubular portion 303 on the inner side to each function as a rib. Thus, with the automatic transmission 25, outward expansion of the free end portion (left end portion in FIG. 4) of the outer tubular portion 301 of the clutch drum 300 due to a centrifugal force can be suppressed well when the clutch drums 300 and 400 are rotated together with the second sun gear 36b of the second planetary gear mechanism 35. In addition, the clutch drum 300 can be positioned in the axial direction by the outer wall portion 402a by fitting the clutch drum 300 with the reduced diameter portion 402n such that the distal end of the inner tubular portion 303 abuts against the back surface of the outer wall portion 402a of the clutch drum 400.

In the automatic transmission 25, further, the clutch drum 400 (outer tubular portion 401) of the clutch C4 is integrally formed with an annular cancellation chamber defining portion 410 that defines a centrifugal hydraulic pressure cancellation chamber 308 configured to cancel a centrifugal hydraulic pressure generated in the engagement oil chamber 306 of the clutch C3 on the outer side together with the clutch drum 300 and the piston 305. As illustrated in FIGS. 3 and 4, the cancellation chamber defining portion 410 is extended outward from the outer tubular portion 401, that is, toward the inner peripheral surface of the outer tubular portion 301 of the clutch drum 300 on the radially outer side with respect to the annular recessed portion 402c. The outer peripheral surface of the cancellation chamber defining portion 410 is in sliding contact with the inner peripheral surface of the piston 305 of the clutch C3. A seal member such as a D-ring or an O-ring is disposed between the cancellation chamber defining portion 410 and the inner peripheral surface of the piston 305. Consequently, the centrifugal hydraulic pressure cancellation chamber 308 is defined between the back surface (a surface on the right side in FIGS. 3 and 4) of the cancellation chamber defining portion 410 and the outer wall portion 402a and the piston 305. Further, a plurality of return springs 309 are disposed between the back surface of the cancellation chamber defining portion 410 and the piston 305. In the embodiment, a plurality of protrusions are formed on the back surface of the cancellation chamber defining portion 410 at equal intervals, and project toward the piston 305 to engage with one end of the corresponding return springs 309.

In this way, by forming the cancellation chamber defining portion 410 for the clutch C3 integrally with the clutch drum 400 of the clutch C4 which includes the outer tubular portion 401, the annular wall portion 402, and the inner tubular portion 403, it is possible to reduce the number of components and the number of man-hours for assembly of the clutches C3 and C4, and to easily improve the precision of the various portions of the clutch drum 400, that is, the positional precision of the outer tubular portion 401, the annular wall portion 402, the inner tubular portion 403, and the cancellation chamber defining portion 410. In addition, by forming the outer tubular portion 401, the annular wall portion 402, the inner tubular portion 403, and the cancellation chamber defining portion 410 integrally with each other, it is possible to securing the strength of the clutch drum 400 well by causing the outer tubular portion 401 and the inner tubular portion 403 to each function as a rib and securing the wall thickness of the cancellation chamber defining portion 410, which achieves a weight reduction by forming the clutch drum 400 from a lightweight material such as an aluminum alloy.

In the embodiment, further, the cancellation chamber defining portion 410 is offset in the axial direction of the outer tubular portion 401 from the outer wall portion 402a of the clutch drum 400 so as to be positioned on the side of the first and second planetary gear mechanisms 30 and 35 (left side in FIG. 4) with respect to the outer wall portion 402a. In this way, by offsetting the cancellation chamber defining portion 410 in the axial direction of the outer tubular portion 401 from the outer wall portion 402a, it is possible to further improve the strength of the clutch drum 400 by suppressing a stress concentration around the base end of the outer tubular portion 401. It should be noted, however, that a separately formed cancellation chamber defining member may be welded or fastened to the clutch drum 400 instead of the cancellation chamber defining portion 410 being formed integrally with the clutch drum 400.

Figure 5:
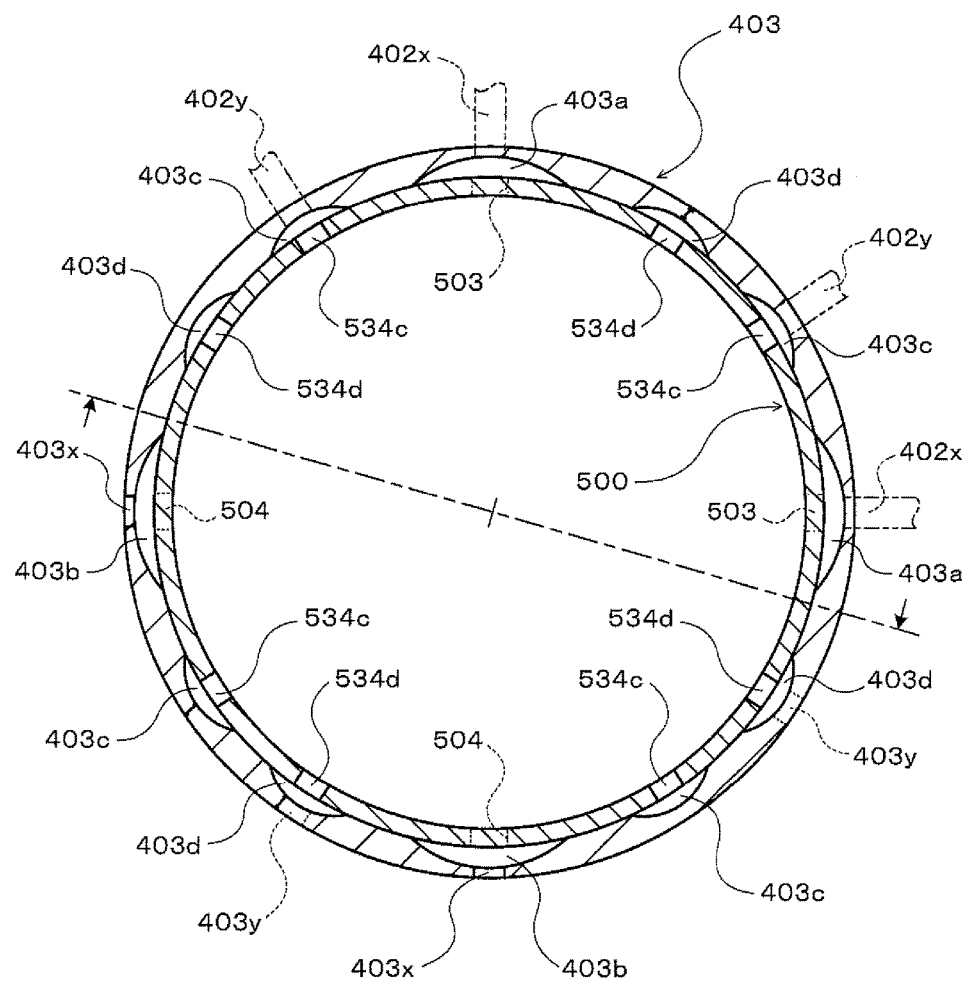
FIG. 5 is a sectional view taken along the line A-A in FIG. 4.
Figure 6:
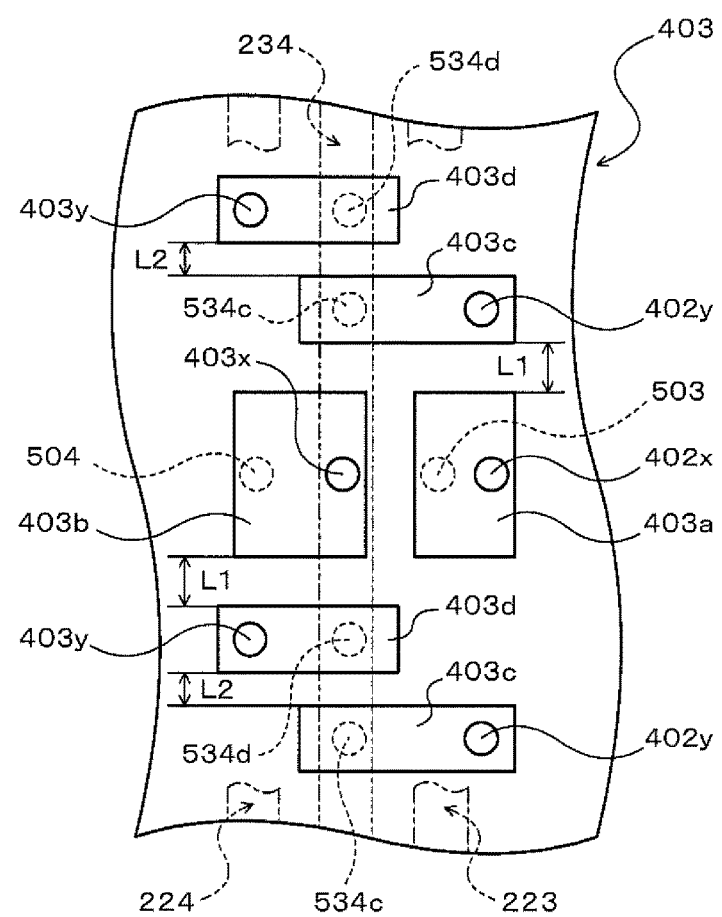
FIG. 6 is a schematic diagram illustrating the structure of oil passages of a clutch of the speed change device according to the present disclosure.

Subsequently, the structure of oil passages configured to supply working oil to the engagement oil chamber 306 and the centrifugal hydraulic pressure cancellation chamber 308 of the clutch C3 and the engagement oil chamber 406 and the centrifugal hydraulic pressure cancellation chamber 408 of the clutch C4 will be described with reference to FIGS. 3 to 6. FIG. 5 is a sectional view taken along the line A-A in FIG. 4. The lower side of FIG. 5 with respect to the dashed-dotted line of the drawing indicates the range on the left side with respect to the dashed-dotted line in FIG. 4. The upper side of FIG. 5 with respect to the dashed-dotted line of the drawing indicates the range on the right side with respect to the dashed-dotted line in FIG. 4. In addition, FIG. 6 is a schematic diagram illustrating the inner surface of the inner tubular portion 403 as seen from the side of the axis of the clutch drum 400. The broken lines in the drawing indicate elements of the sleeve 500. The dashed-two-dotted lines in the drawing indicate elements of the front support 22f.

In the automatic transmission 25, as illustrated in FIGS. 3 to 5, in order to make it possible to supply and discharge working oil to and from the engagement oil chamber 306 and the centrifugal hydraulic pressure cancellation chamber 308 of the clutch C3 which are defined around the inner tubular portion 303 of the clutch drum 300, a plurality of engagement oil chamber oil passages 402x (the number of which is the same as that of the oil holes 303x described above, which is four in the embodiment) that extend in the radial direction and radially and a plurality of (in the embodiment, four) cancellation chamber oil passages 402y that extend in the radial direction and radially, alternately so as not to overlap the plurality of engagement oil chamber oil passages 402x as seen in the axial direction, are formed in the inner wall portion 402b of the clutch drum 400. The engagement oil chamber oil passages 402x communicate with the corresponding oil holes 303x of the inner tubular portion 303 of the clutch drum 300. The cancellation chamber oil passages 402y communicate with a corresponding one of a plurality of recessed portions 402r (see FIGS. 3 and 4) formed in the back surface of the outer wall portion 402a of the clutch drum 400 and the outer peripheral surface 402o of the reduced diameter portion 402n so as to extend in a generally L-shape and communicate with the centrifugal hydraulic pressure cancellation chamber 308.

In this way, by forming the engagement oil chamber oil passages 402x and the cancellation chamber oil passages 402y on the generally same plane in the inner wall portion 402b of the clutch drum 400, an increase in axial length of the clutch drum 400, and hence the clutches C3 and C4, can be suppressed. Further, by forming the engagement oil chamber oil passages 402x and the cancellation chamber oil passages 402y alternately as seen in the axial direction, working oil can be supplied generally uniformly to the engagement oil chamber 306 and the centrifugal hydraulic pressure cancellation chamber 308 which are annular. In addition, a plurality of (in the embodiment, four) C4 engagement oil chamber oil holes 403x which respectively communicate with the engagement oil chamber 406 are formed in the inner tubular portion 403 of the clutch drum 400 at intervals in the circumferential direction.

Further, a plurality of (in the embodiment, four) C3 engagement oil chamber recessed portions (second engagement oil chamber recessed portions) 403a that communicate with the engagement oil chamber oil passages 402x and a plurality of (in the embodiment, four) C4 engagement oil chamber recessed portions (first engagement oil chamber recessed portions) 403b that communicate with the C4 engagement oil chamber oil holes 403x are formed in the inner peripheral surface of the inner tubular portion 403 so as to be arranged side by side with each other at intervals in the circumferential direction. In the embodiment, as illustrated in FIG. 6, the C3 engagement oil chamber recessed portions 403a and the C4 engagement oil chamber recessed portions 403b are disposed in the inner peripheral surface of the inner tubular portion 403 such that one C3 engagement oil chamber recessed portion 403a and one C4 engagement oil chamber recessed portion 403b are arranged side by side with each other in the axial direction of the clutch drum 400.

In addition, a plurality of (in the embodiment, four) C3 cancellation chamber recessed portions (second cancellation chamber recessed portions) 403c that communicate with the cancellation chamber oil passages 402y and a plurality of (in the embodiment, four) C4 cancellation chamber recessed portions (first cancellation chamber recessed portions) 403d that communicate with C4 cancellation chamber oil holes 403y are formed in the inner peripheral surface of the inner tubular portion 403 so as to be arranged side by side with each other at intervals in the circumferential direction and be arranged side by side with the C3 engagement oil chamber recessed portions 403a and the C4 engagement oil chamber recessed portions 403b at intervals in the circumferential direction. As illustrated in FIG. 6, an interval L1 in the circumferential direction between: the C3 engagement oil chamber recessed portion 403a and the C4 engagement oil chamber recessed portion 403b; and the C3 cancellation chamber recessed portion 403c or the C4 cancellation chamber recessed portion 403d is determined to be longer than an interval L2 in the circumferential direction between the C3 cancellation chamber recessed portion 403c and the C4 cancellation chamber recessed portion 403d.

On the other hand, as illustrated in FIG. 3, the outer peripheral surface of the tubular portion 220 of the front support 22f which rotatably supports the clutch drum 400 is provided with a C3 engagement hydraulic pressure supply oil passage (second engagement hydraulic pressure supply oil passage) 223, a C4 engagement hydraulic pressure supply oil passage (first engagement hydraulic pressure supply oil passage) 224, and a cancellation chamber supply oil passage (cancel oil supply oil passage) 234, which are each an annular recessed portion (groove). The C3 engagement hydraulic pressure supply oil passage 223 is formed on the side of the base end (on the side of the right end in FIG. 3) of the tubular portion 220 so as to be positioned on the inner side of the C3 engagement oil chamber recessed portion 403a of the inner tubular portion 403 which is supported by the tubular portion 220, and connected to the hydraulic control device 60 via a corresponding one of a plurality of radial oil passages 221, a corresponding one of a plurality of axial oil passages 222, and a corresponding one of a plurality of oil holes 225 formed in the front support 22f.

The C4 engagement hydraulic pressure supply oil passage 224 is formed on the side of the free end (on the side of the left end in FIG. 3) of the tubular portion 220 so as to be positioned on the inner side of the C4 engagement oil chamber recessed portion 403b of the inner tubular portion 403 which is supported by the tubular portion 220, and connected to the hydraulic control device 60 via a corresponding one of the plurality of radial oil passages 221, a corresponding one of the plurality of axial oil passages 222, and a corresponding one of the plurality of oil holes 225 formed in the front support 22f. In addition, the cancellation chamber supply oil passage 234 is formed in the tubular portion 220 so as to be positioned between the C3 engagement hydraulic pressure supply oil passage 223 and the C4 engagement hydraulic pressure supply oil passage 224 in the axial direction of the tubular portion 220, and connected to the hydraulic control device 60 (drain oil passage) via a corresponding one of the plurality of radial oil passages 221, a corresponding one of the plurality of axial oil passages 222, and a corresponding one of the plurality of oil holes 225 formed in the front support 22f.

As illustrated in FIG. 6, a plurality of oil holes 503 and 504 and a plurality of C3 cancel oil supply holes (first cancel oil supply holes) 534c and C4 cancel oil supply holes (second cancel oil supply holes) 534d are formed in the sleeve 500 which is fitted into the inner tubular portion 403 of the clutch drum 400. The oil holes 503 are formed in the sleeve 500 so as to allow communication between the C3 engagement hydraulic pressure supply oil passage 223 on the inner side and the C3 engagement oil chamber recessed portion 403a on the outer side. In addition, the oil holes 504 are formed in the sleeve 500 so as to allow communication between the C4 engagement hydraulic pressure supply oil passage 224 on the inner side and the C4 engagement oil chamber recessed portion 403b on the outer side.

Further, the C3 cancel oil supply holes 534c are formed in the sleeve 500 so as to allow communication between the cancellation chamber supply oil passage 234 on the inner side and the C3 cancellation chamber recessed portion 403c on the outer side to supply working oil (cancel oil) from the cancellation chamber supply oil passage 234 to the C3 cancellation chamber recessed portion 403c. In addition, the C4 cancel oil supply holes 534d are formed in the sleeve 500 so as to allow communication between the cancellation chamber supply oil passage 234 on the inner side and the C4 cancellation chamber recessed portion 403d on the outer side to supply working oil (cancel oil) from the cancellation chamber supply oil passage 234 to the C4 cancellation chamber recessed portion 403d.

Consequently, working oil (the engagement hydraulic pressure for the clutch C3) from the hydraulic control device 60 supplied to the C3 engagement hydraulic pressure supply oil passage 223 of the tubular portion 220 via the oil passages 221, 222, etc. of the front support 22f is supplied to the engagement oil chamber 306 of the clutch C3 via the oil hole 503 of the sleeve 500, the C3 engagement oil chamber recessed portion 403a of the inner tubular portion 403, the engagement oil chamber oil passage 402x of the inner wall portion 402b, and the oil hole 303x of the inner tubular portion 303 of the clutch drum 300. In addition, working oil (the engagement hydraulic pressure for the clutch C4) from the hydraulic control device 60 supplied to the C4 engagement hydraulic pressure supply oil passage 224 of the tubular portion 220 via the oil passages 221, 222, etc. of the front support 22f is supplied to the engagement oil chamber 406 of the clutch C4 via the oil hole 504 of the sleeve 500 and the C4 engagement oil chamber recessed portion 403b and the C4 engagement oil chamber oil hole 403x of the inner tubular portion 403.

Further, working oil (cancel oil, that is, drain oil) from the hydraulic control device 60 supplied to the cancellation chamber supply oil passage 234 of the tubular portion 220 via the oil passages 221, 222, etc. of the front support 22f is supplied to the centrifugal hydraulic pressure cancellation chamber 308 of the clutch C3 via the C3 cancel oil supply hole 534c of the sleeve 500, the C3 cancellation chamber recessed portion 403c of the inner tubular portion 403, the cancellation chamber oil passage 402y of the inner wall portion 402b, and the recessed portion 402r. In addition, working oil (cancel oil, that is, drain oil) from the hydraulic control device 60 supplied to the cancellation chamber supply oil passage 234 of the tubular portion 220 via the oil passages 221, 222, etc. of the front support 22f is supplied to the centrifugal hydraulic pressure cancellation chamber 408 of the clutch C4 via the C4 cancel oil supply hole 534d of the sleeve 500, the C4 cancellation chamber recessed portion 403d of the inner tubular portion 403, and the C4 cancellation chamber oil hole 403y.

In the embodiment, in addition, as illustrated in FIG. 6, the plurality of C3 cancel oil supply holes 534c and C4 cancel oil supply holes 534d are disposed in the sleeve 500 so as to be arranged in a row in the circumferential direction (possibly with slight displacement in the axial direction). Consequently, working oil (cancel oil) can be supplied to the C3 cancel oil supply holes 534c and the C4 cancel oil supply holes 534d from the common (single) cancellation chamber supply oil passage 234 which is formed in the tubular portion 220 of the front support 22f. Thus, with the automatic transmission 25, it is possible to suppress an increase in axial length of the inner tubular portion 403 of the clutch drum 400, that is, the clutches C3 and C4.

As discussed above, the clutch drum 400 (first clutch drum) which constitutes the clutch C4 (first clutch) of the automatic transmission 25 has: the outer tubular portion 401 (first outer tubular portion) which extends in the axial direction and which is fitted with the outer peripheral portion of the separator plates 404s (first friction engagement plates); the inner tubular portion 403 (first inner tubular portion) which extends in the axial direction on the inner side of the outer tubular portion 401 and which movably supports the inner peripheral portion of the pressure receiving portion 405a of the piston 405 (first piston); and the annular wall portion 402 (first annular wall portion) which is formed integrally with the outer tubular portion 401 and the inner tubular portion 403 so as to extend in the radial direction between the outer tubular portion 401 and the inner tubular portion 403.

In addition, the piston 405 has the tubular extended portion 405c which extends in the axial direction toward the annular wall portion 402, and the annular wall portion 402 of the clutch drum 400 has: the intermediate tubular portion 420 which is formed in proximity to the inner tubular portion 403 compared to the outer peripheral surface 402o of the reduced diameter portion 402n, that is, the joint surface between the clutch drums 300 and 400, so as to extend toward the piston 405; and the annular recessed portion 402c which is formed in proximity to the inner tubular portion 403 compared to the outer peripheral surface 402o of the reduced diameter portion 402n and into which the extended portion 405c of the piston 405 is inserted (fitted). The extended portion 405c of the piston 405 is inserted (fitted) into the annular recessed portion 402c of the annular wall portion 402, and the seal member 90 is disposed between the inner peripheral surface of the extended portion 405c and the outer peripheral surface 421 of the intermediate tubular portion 420. Consequently, the engagement oil chamber 406 (first engagement oil chamber) of the clutch C4 is defined by the piston 405 and the annular wall portion 402 on the radially inner side with respect to the outer peripheral surface of the extended portion 405c.

In this way, by bringing the inner peripheral surface of the extended portion 405c of the piston 405 of the clutch C4 and the outer peripheral surface 421 of the intermediate tubular portion 420 which defines the annular recessed portion 402c of the annular wall portion 402 into sliding contact with each other and disposing the seal member 90 between the inner peripheral surface of the extended portion 405c and the outer peripheral surface 421 of the intermediate tubular portion 420 to define the engagement oil chamber 406, the distance between the joint surface between the clutch drum 400 and the clutch drum 300 and the outer peripheral surface 421 of the intermediate tubular portion 420 which is in sliding contact with the inner peripheral surface of the extended portion 405c can be made longer. Consequently, it is possible to well suppress occurrence of distortion of the outer peripheral surface 421 of the intermediate tubular portion 420 due to the influence of heat when the clutch drum 300 is welded to the outer peripheral surface 402o of the clutch drum 400 (reduced diameter portion 402n).

Here, the clutch drum 400 of the clutch C4 is formed integrally with the cancellation chamber defining portion 410 which is extended radially outward with respect to the annular recessed portion 402c so as to oppose the piston 305 of the clutch C3 and which defines the centrifugal hydraulic pressure cancellation chamber 308 which is configured to cancel a centrifugal hydraulic pressure generated in the engagement oil chamber 306. Therefore, it is necessary to assemble the piston 405, the return springs 409, the seal member, and so forth in advance in the clutch drum 300 before the clutch drum 300 is welded to the outer peripheral surface 402o of the clutch drum 400 (reduced diameter portion 402n). However, with the automatic transmission 25, as discussed above, the dimensional precision of the outer peripheral surface 421 of the intermediate tubular portion 420 can be secured well after the clutch drum 400 and the clutch drum 300 are welded to each other. Thus, it is no longer necessary to perform a surface treatment on or wash the outer peripheral surface 421 of the intermediate tubular portion 420 after the clutch drum 400 and the clutch drum 300 are welded to each other. As a result, it is possible to further improve the dimensional precision of the clutch C4 and the assemblability of the entire automatic transmission 25.

In addition, the piston 405 has the recessed circular columnar surface 405d which extends toward the opposite side of the extended portion 405c on the radially outer side with respect to the inner peripheral surface of the extended portion 405c and which is in sliding contact with the seal member 91 which is mounted to the outer peripheral portion of the cancel plate 407 of the clutch C4. Consequently, as seen from FIG. 4 etc., the chamber diameter (outside diameter) of the centrifugal hydraulic pressure cancellation chamber 408 (first centrifugal hydraulic pressure cancellation chamber) of the clutch C4 can be made larger than the chamber diameter (outside diameter) of the engagement oil chamber 406, which makes it possible to lower the rigidity (spring constant) of the return springs 409 by well securing the performance for canceling the centrifugal hydraulic pressure in the centrifugal hydraulic pressure cancellation chamber 408. As a result, a hydraulic pressure to be supplied to the engagement oil chamber 406 to engage the clutch C4 (an engagement hydraulic pressure for the clutch C4) can be lowered to further improve the fuel efficiency of the vehicle on which the automatic transmission 25 is mounted.

In this way, in the automatic transmission 25, the performance for canceling the centrifugal hydraulic pressure in the centrifugal hydraulic pressure cancellation chamber 408 can be secured to be sufficiently high by making the chamber diameter of the centrifugal hydraulic pressure cancellation chamber 408 of the clutch C4 larger than the chamber diameter of the engagement oil chamber 406. Thus, in the clutch C4, as illustrated in FIGS. 3 and 4, at least one oil hole 407h can be formed in the inner peripheral portion of the cancel plate 407 to displace a zero base point B0 of the centrifugal hydraulic pressure in the centrifugal hydraulic pressure cancellation chamber 408 radially outward to the outermost peripheral point of the oil hole 407h (see FIG. 4). Consequently, a part of working oil (cancel oil) that has flowed into the centrifugal hydraulic pressure cancellation chamber 408 from the oil hole 407h of the cancel plate 407 can be caused to flow out to be used to lubricate a meshing portion between the sun gear 31 and the pinion gear 33a, a meshing portion between the pinion gear 33b and the pinion gear 33a, and a meshing portion between the pinion gear 33b and the ring gear 32 of the first planetary gear mechanism 30, and so forth.

In the automatic transmission 25, the C3 cancellation chamber recessed portions 403c (second cancellation chamber recessed portions) which communicate with the cancellation chamber oil passage 402y, which extends in the radial direction to communicate with the centrifugal hydraulic pressure cancellation chamber 308 of the clutch C3 on the outer side, and the cancellation chamber supply oil passage 234 (cancel oil supply oil passage) and the C4 cancellation chamber recessed portions 403d (first cancellation chamber recessed portions) which communicate with the C4 cancellation chamber oil hole 403y, which is formed in the inner tubular portion 403 so as to communicate with the centrifugal hydraulic pressure cancellation chamber 408 of the clutch C4 on the inner side, and the cancellation chamber supply oil passage 234 are formed at intervals in the circumferential direction in the inner peripheral surface of the inner tubular portion 403 of the clutch drum 400 which constitutes the drum member together with the clutch drum 300.

Consequently, the zero base point B0 of the centrifugal hydraulic pressure in the centrifugal hydraulic pressure cancellation chamber 408 of the clutch C4 can be moved radially outward as discussed above without varying the zero base point of the centrifugal hydraulic pressure in the centrifugal hydraulic pressure cancellation chamber 308 (second centrifugal hydraulic pressure cancellation chamber) of the clutch C3. Thus, with the automatic transmission 25, the performance for canceling the centrifugal hydraulic pressure in both the centrifugal hydraulic pressure cancellation chambers 308 and 408 can be secured well.

That is, by independently providing the inner peripheral surface of the inner tubular portion 403 of the clutch drum 400 with the C3 cancellation chamber recessed portion 403c through which working oil (cancel oil) is supplied to the cancellation chamber oil passage 402y and the C4 cancellation chamber recessed portion 403d through which working oil (cancel oil) is supplied to the C4 cancellation chamber oil hole 403y, the zero base point of the centrifugal hydraulic pressure can be set independently for the centrifugal hydraulic pressure cancellation chambers 308 and 408. As a result, with the automatic transmission 25, the degree of freedom in adjusting the cancel performance for the centrifugal hydraulic pressure cancellation chamber 408 of the clutch C4 (first clutch) on the inner side and the cancel performance for the centrifugal hydraulic pressure cancellation chamber 308 of the clutch C3 (second clutch) on the outer side can be improved.

In the embodiment described above, in addition, the interval L1 in the circumferential direction between: the C3 engagement oil chamber recessed portion 403a and the C4 engagement oil chamber recessed portion 403b; and the C3 cancellation chamber recessed portion 403c or the C4 cancellation chamber recessed portion 403d is determined to be longer than the interval L2 in the circumferential direction between the C3 cancellation chamber recessed portion 403c and the C4 cancellation chamber recessed portion 403d. Consequently, the seal performance between: the C3 engagement oil chamber recessed portion 403a and the C4 engagement oil chamber recessed portion 403b; and the C3 cancellation chamber recessed portion 403c or the C4 cancellation chamber recessed portion 403d can be secured well, and passage of working oil between: the C3 engagement oil chamber recessed portion 403a and the C4 engagement oil chamber recessed portion 403b; and the C3 cancellation chamber recessed portion 403c or the C4 cancellation chamber recessed portion 403d can be suppressed better.

In the embodiment described above, further, the plurality of C3 cancel oil supply holes 534c through which working oil (cancel oil) is supplied to the C3 cancellation chamber recessed portion 403c and the plurality of C4 cancel oil supply holes 534d through which working oil (cancel oil) is supplied to the C4 cancellation chamber recessed portion 403d are disposed in the sleeve 500, which is fitted with the inner tubular portion 403 of the clutch drum 400, so as to be arranged in a row in the circumferential direction, and the C3 cancel oil supply holes 534c and the C4 cancel oil supply holes 534d are supplied with working oil (cancel oil) from the common cancellation chamber supply oil passage 234 which is provided on the inner side with respect to the inner tubular portion 403. Consequently, it is possible to suppress an increase in axial length of the inner tubular portion 403 of the clutch drum 400, that is, the clutches C3 and C4.

As has been described above, a speed change device that includes a first clutch that has a first piston, a first engagement oil chamber, and a first centrifugal hydraulic pressure cancellation chamber configured to cancel a centrifugal hydraulic pressure generated in the first engagement oil chamber, and a second clutch that has a second piston, a second engagement oil chamber, and a second centrifugal hydraulic pressure cancellation chamber configured to cancel a centrifugal hydraulic pressure generated in the second engagement oil chamber and that is disposed around the first clutch is characterized by including a drum member that defines the first engagement oil chamber together with the first piston and that defines the second engagement oil chamber together with the second piston; and is characterized in that the drum member has an inner tubular portion that supports the first piston and a cancellation chamber defining member that defines the first centrifugal hydraulic pressure cancellation chamber together with the first piston, a cancellation chamber defining portion that defines the second centrifugal hydraulic pressure cancellation chamber together with the second piston, a cancellation chamber oil hole formed in the inner tubular portion so as to communicate with the first centrifugal hydraulic pressure cancellation chamber, and a cancellation chamber oil passage that communicates with the second centrifugal hydraulic pressure cancellation chamber; and a first cancellation chamber recessed portion that communicates with the cancellation chamber oil hole to supply cancel oil to the cancellation chamber oil hole and a second cancellation chamber recessed portion that communicates with the cancellation chamber oil passage to supply the cancel oil to the cancellation chamber oil passage are formed in an inner peripheral surface of the inner tubular portion of the drum member at intervals in a circumferential direction.

That is, the speed change device described above includes the first clutch and the second clutch which is disposed around the first clutch, and the first and second clutches share the drum member which defines the first engagement oil chamber together with the first piston and which defines the second engagement oil chamber together with the second piston. In addition, the drum member has: the inner tubular portion which supports the first piston and the cancellation chamber defining member which defines the first centrifugal hydraulic pressure cancellation chamber together with the first piston; the cancellation chamber defining portion which defines the second centrifugal hydraulic pressure cancellation chamber together with the second piston; the cancellation chamber oil hole which is formed in the inner tubular portion so as to communicate with the first centrifugal hydraulic pressure cancellation chamber; and the cancellation chamber oil passage which communicates with the second centrifugal hydraulic pressure cancellation chamber. The first cancellation chamber recessed portions which communicate with the cancellation chamber oil hole to supply cancellation oil to the cancellation chamber oil hole and the second cancellation chamber recessed portions which communicate with the cancellation chamber oil passage to supply the cancellation oil to the cancellation chamber oil passage are formed in the inner peripheral surface of the inner tubular portion of the drum member at intervals in the circumferential direction.

Consequently, by independently providing the inner peripheral surface of the inner tubular portion of the drum member with the first cancellation chamber recessed portion which communicates with the cancellation chamber oil hole and the second cancellation chamber recessed portion which communicates with the cancellation chamber oil passage, the zero base point of the centrifugal hydraulic pressure can be set independently for the first centrifugal hydraulic pressure cancellation chamber and the second centrifugal hydraulic pressure cancellation chamber. As a result, with the speed change device described above, the degree of freedom in adjusting the cancel performance for the first centrifugal hydraulic pressure cancellation chamber of the first clutch on the inner side and the cancel performance for the second centrifugal hydraulic pressure cancellation chamber of the second clutch on the outer side can be improved.

The speed change device may further include a sleeve that has a first cancellation oil supply hole through which the cancellation oil is supplied to the first cancellation chamber recessed portion and a second cancellation oil supply hole through which the cancellation oil is supplied to the second cancellation chamber recessed portion, the sleeve being fitted with the inner tubular portion of the drum member; and the first and second cancellation oil supply holes may be disposed in the sleeve so as to be arranged in a row in the circumferential direction; and the first and second cancellation oil supply holes may be supplied with the cancellation oil from a common cancel oil supply oil passage provided on an inner side with respect to the sleeve. In this way, by disposing the first and second cancel oil supply holes in the sleeve so as to be arranged in a row in the circumferential direction, cancel oil can be supplied to the first and second cancel oil supply holes from the common cancel oil supply oil passage. Thus, it is possible to suppress an increase in axial length of the inner tubular portion of the clutch drum, that is, the first and second clutches.

The inner tubular portion of the drum member may be rotatably supported by a tubular portion extended in an axial direction from a case that houses the first and second clutches; and the cancel oil supply oil passage may be formed in the tubular portion.

The drum member may have an engagement oil chamber oil hole formed in the inner tubular portion so as to communicate with the first engagement oil chamber, and an engagement oil chamber oil passage that extends in a radial direction to communicate with the second engagement oil chamber; a first engagement oil chamber recessed portion that communicates with the engagement oil chamber oil hole and a first engagement hydraulic pressure supply oil passage provided on an inner side of the inner tubular portion and a second engagement oil chamber recessed portion that communicates with the engagement oil chamber oil passage and a second engagement hydraulic pressure supply oil passage provided on the inner side of the inner tubular portion may be formed in an inner peripheral surface of the inner tubular portion of the drum member so as to be arranged in an axial direction of the drum member and be arranged side by side with the first or second cancellation chamber recessed portion at intervals in the circumferential direction; the sleeve may have an oil hole that allows communication between the first engagement hydraulic pressure supply oil passage and the first engagement oil chamber recessed portion, and an oil hole that allows communication between the second engagement hydraulic pressure supply oil passage and the second engagement oil chamber recessed portion; and the interval in the circumferential direction between the first and second engagement oil chamber recessed portions and the first or second cancellation chamber recessed portion may be longer than the interval in the circumferential direction between the first cancellation chamber recessed portion and the second cancellation chamber recessed portion. Consequently, the seal performance between the first and second engagement oil chamber recessed portions and the first or second cancellation chamber recessed portion can be secured well, and passage of oil between the first and second engagement oil chamber recessed portions and the first or second cancellation chamber recessed portion can be suppressed better.

The first clutch may include a return spring disposed between the first piston and the cancellation chamber defining member; and a chamber diameter of the first centrifugal hydraulic pressure cancellation chamber may be larger than a chamber diameter of the first engagement oil chamber. In this way, if the chamber diameter of the first centrifugal hydraulic pressure cancellation chamber is made larger than the chamber diameter of the first engagement oil chamber, it is possible to lower the rigidity (spring constant) of the return spring by well securing the performance for canceling the centrifugal hydraulic pressure in the first centrifugal hydraulic pressure cancellation chamber. Consequently, a hydraulic pressure to be supplied to the first engagement oil chamber to engage the first clutch can be lowered to further improve the fuel efficiency of the vehicle on which the speed change device is mounted.

The drum member may has a first annular wall portion that extends from the inner tubular portion toward. The first piston may have a tubular extended portion that extends in an axial direction toward the first annular wall portion, and a recessed circular columnar surface that extends toward an opposite side of the extended portion on a radially outer side with respect to an inner peripheral surface of the extended portion and that is in sliding contact with a seal member mounted to an outer peripheral portion of the cancellation chamber defining member; the drum member may have an annular recessed portion with which the extended portion of the first piston is fitted, and a circular columnar surface that defines the annular recessed portion and that is in sliding contact with the inner peripheral surface of the extended portion; and a seal member may be disposed between the extended portion of the first piston and the circular columnar surface of the drum member. Consequently, the chamber diameter of the first centrifugal hydraulic pressure cancellation chamber can be made larger than the chamber diameter of the first engagement oil chamber.

An oil hole that allows the cancellation oil to flow out may be formed in an inner peripheral portion of the cancellation chamber defining member.

That is, in the case where the performance for canceling the centrifugal hydraulic pressure in the first centrifugal hydraulic pressure cancellation chamber can be secured sufficiently by making the chamber diameter of the first centrifugal hydraulic pressure cancellation chamber larger than the chamber diameter of the first engagement oil chamber, the zero base point of the centrifugal hydraulic pressure in the first centrifugal hydraulic pressure cancellation chamber can be displaced radially outward. Thus, in such a case, an oil hole can be formed in the inner peripheral portion of the cancellation chamber defining member, and a part of cancel oil that has flowed into the first centrifugal hydraulic pressure cancellation chamber from the oil hole can be caused to flow out to be used to lubricate other members or the like. In this case, by independently providing the inner peripheral surface of the inner tubular portion of the drum member with the first cancellation chamber recessed portion and the second cancellation chamber recessed portion, the zero base point of the centrifugal hydraulic pressure in the first centrifugal hydraulic pressure cancellation chamber can be moved radially outward without varying the zero base point of the centrifugal hydraulic pressure in the second centrifugal hydraulic pressure cancellation chamber. Thus, the performance for canceling the centrifugal hydraulic pressure in the second centrifugal hydraulic pressure cancellation chamber can be secured well.

The drum member may include a first clutch drum that defines the first engagement oil chamber together with the first piston, and a second clutch drum that is joined to the first clutch drum and that defines the second engagement oil chamber on a radially outer side with respect to the first engagement oil chamber together with the second piston; the first clutch drum may have the inner tubular portion, the cancellation chamber defining portion, a first outer tubular portion which extends in an axial direction on an outer side of the inner tubular portion and with which an outer peripheral portion of a first friction engagement plate is fitted, and a first annular wall portion formed integrally with the inner tubular portion and the first outer tubular portion so as to extend in a radial direction between the inner tubular portion and the first outer tubular portion; and the second clutch drum may have a second inner tubular portion that supports the second piston, a second outer tubular portion which extends in the axial direction on an outer side of the second inner tubular portion and with which an outer peripheral portion of a second friction engagement plate is fitted, and a second annular wall portion formed integrally with the second inner tubular portion and the second outer tubular portion so as to extend in the radial direction between the second inner tubular portion and the second outer tubular portion.

The drum member may define the second engagement oil chamber on a radially outer side with respect to the first engagement oil chamber together with the second piston; the cancellation chamber defining portion of the drum member may define the second centrifugal hydraulic pressure cancellation chamber on the radially outer side with respect to the first centrifugal hydraulic pressure cancellation chamber together with the second piston; and the cancellation chamber oil passage of the drum member may extend in a radial direction of the drum member.

The present disclosure is not limited to the embodiment described above in any way, and it is a matter of course that the present disclosure may be modified in various ways without departing from the broad scope of the present disclosure. Further, the mode for carrying out the disclosure described above is merely a specific form of the disclosure described in the "SUMMARY" section, and does not limit the elements of the disclosure described in the "SUMMARY" section.

INDUSTRIAL APPLICABILITY

The present disclosure can be utilized in a speed change device, the manufacturing industry for power transfer devices that include the speed change device, and so forth.

The invention claimed is:

1. A speed change device comprising:
    a first clutch that has a first piston, a first engagement oil chamber, and a first centrifugal hydraulic pressure cancellation chamber configured to cancel a centrifugal hydraulic pressure generated in the first engagement oil chamber;
    a second clutch that has a second piston, a second engagement oil chamber, and a second centrifugal hydraulic pressure cancellation chamber configured to cancel a centrifugal hydraulic pressure generated in the second engagement oil chamber and that is disposed around the first clutch; and
    a drum member that defines the first engagement oil chamber together with the first piston and that defines the second engagement oil chamber together with the second piston, wherein:
        the drum member has an inner tubular portion that supports the first piston and a cancellation chamber defining member that defines the first centrifugal hydraulic pressure cancellation chamber together with the first piston, a cancellation chamber oil hole formed in the inner tubular portion so as to communicate with the first centrifugal hydraulic pressure cancellation chamber, and a cancellation chamber oil passage that communicates with the second centrifugal hydraulic pressure cancellation chamber; and
        a first cancellation chamber recessed portion that communicates with the cancellation chamber oil hole to supply cancel oil to the cancellation chamber oil hole and a second cancellation chamber recessed portion that communicates with the cancellation chamber oil passage to supply the cancel oil to the cancellation chamber oil passage are formed in an inner peripheral surface of the inner tubular portion of the drum member at intervals in a circumferential direction.

2. The speed change device according to claim 1, further comprising:
    a sleeve that has a first cancel oil supply hole through which the cancel oil is supplied to the first cancellation chamber recessed portion and a second cancel oil supply hole through which the cancel oil is supplied to the second cancellation chamber recessed portion, the sleeve being fitted with the inner tubular portion of the drum member, wherein:
        the first and second cancel oil supply holes are disposed in the sleeve so as to be arranged in a row in the circumferential direction; and
        the first and second cancel oil supply holes are supplied with the cancel oil from a common cancel oil supply oil passage provided on an inner side with respect to the sleeve.

3. The speed change device according to claim 2, wherein:
    the inner tubular portion of the drum member is rotatably supported by a tubular portion extended in an axial direction from a case that houses the first and second clutches; and
    the cancel oil supply oil passage is formed in the tubular portion.

4. The speed change device according to claim 3, wherein:
    the drum member has an engagement oil chamber oil hole formed in the inner tubular portion so as to communicate with the first engagement oil chamber, and an engagement oil chamber oil passage that extends in a radial direction to communicate with the second engagement oil chamber;
    a first engagement oil chamber recessed portion that communicates with the engagement oil chamber oil hole and a first engagement hydraulic pressure supply oil passage provided on an inner side of the inner tubular portion and a second engagement oil chamber recessed portion that communicates with the engagement oil chamber oil passage and a second engagement hydraulic pressure supply oil passage provided on the inner side of the inner tubular portion are formed in an inner peripheral surface of the inner tubular portion of the drum member so as to be arranged in an axial direction of the drum member and be arranged side by side with the first or second cancellation chamber recessed portion at intervals in the circumferential direction;
    the sleeve has an oil hole that allows communication between the first engagement hydraulic pressure supply oil passage and the first engagement oil chamber recessed portion, and an oil hole that allows communication between the second engagement hydraulic pressure supply oil passage and the second engagement oil chamber recessed portion; and
    the interval in the circumferential direction between the first and second engagement oil chamber recessed portions and the first or second cancellation chamber recessed portion is longer than the interval in the circumferential direction between the first cancellation chamber recessed portion and the second cancellation chamber recessed portion.

5. The speed change device according to claim 4, wherein:
the first clutch includes a return spring disposed between the first piston and the cancellation chamber defining member; and
a chamber diameter of the first centrifugal hydraulic pressure cancellation chamber is larger than a chamber diameter of the first engagement oil chamber.

6. The speed change device according to claim 5, wherein:
the drum member has a first annular wall portion that extends from the inner tubular portion toward a radially outer side;
the first piston has a tubular extended portion that extends in an axial direction toward the first annular wall portion, and a recessed circular columnar surface that extends toward an opposite side of the extended portion on a radially outer side with respect to an inner peripheral surface of the extended portion and that is in sliding contact with a seal member mounted to an outer peripheral portion of the cancellation chamber defining member;
the drum member has an annular recessed portion with which the extended portion of the first piston is fitted, and a circular columnar surface that defines the annular recessed portion and that is in sliding contact with the inner peripheral surface of the extended portion; and
a seal member is disposed between the extended portion of the first piston and the circular columnar surface of the drum member.

7. The speed change device according to claim 6, wherein:
an oil hole that allows the cancel oil to flow out is formed in an inner peripheral portion of the cancellation chamber defining member.

8. The speed change device according to claim 7, wherein:
the drum member includes a first clutch drum that defines the first engagement oil chamber together with the first piston, and a second clutch drum that is joined to the first clutch drum and that defines the second engagement oil chamber on a radially outer side with respect to the first engagement oil chamber together with the second piston;
the first clutch drum has the inner tubular portion, the cancellation chamber defining portion, a first outer tubular portion which extends in an axial direction on an outer side of the inner tubular portion and with which an outer peripheral portion of a first friction engagement plate is fitted, and a first annular wall portion formed integrally with the inner tubular portion and the first outer tubular portion so as to extend in a radial direction between the inner tubular portion and the first outer tubular portion; and
the second clutch drum has a second inner tubular portion that supports the second piston, a second outer tubular portion which extends in the axial direction on an outer side of the second inner tubular portion and with which an outer peripheral portion of a second friction engagement plate is fitted, and a second annular wall portion formed integrally with the second inner tubular portion and the second outer tubular portion so as to extend in the radial direction between the second inner tubular portion and the second outer tubular portion.

9. The speed change device according to claim 8, wherein:
the drum member defines the second engagement oil chamber on a radially outer side with respect to the first engagement oil chamber together with the second piston;
the cancellation chamber defining portion of the drum member defines the second centrifugal hydraulic pressure cancellation chamber on the radially outer side with respect to the first centrifugal hydraulic pressure cancellation chamber together with the second piston; and
the cancellation chamber oil passage of the drum member extends in a radial direction of the drum member.

10. The speed change device according to claim 3, wherein:
the first clutch includes a return spring disposed between the first piston and the cancellation chamber defining member; and
a chamber diameter of the first centrifugal hydraulic pressure cancellation chamber is larger than a chamber diameter of the first engagement oil chamber.

11. The speed change device according to claim 2, wherein:
the first clutch includes a return spring disposed between the first piston and the cancellation chamber defining member; and
a chamber diameter of the first centrifugal hydraulic pressure cancellation chamber is larger than a chamber diameter of the first engagement oil chamber.

12. The speed change device according to claim 11, wherein:
the drum member has a first annular wall portion that extends from the inner tubular portion toward a radially outer side;
the first piston has a tubular extended portion that extends in an axial direction toward the first annular wall portion, and a recessed circular columnar surface that extends toward an opposite side of the extended portion on a radially outer side with respect to an inner peripheral surface of the extended portion and that is in sliding contact with a seal member mounted to an outer peripheral portion of the cancellation chamber defining member;
the drum member has an annular recessed portion with which the extended portion of the first piston is fitted, and a circular columnar surface that defines the annular recessed portion and that is in sliding contact with the inner peripheral surface of the extended portion; and
a seal member is disposed between the extended portion of the first piston and the circular columnar surface of the drum member.

13. The speed change device according to claim 12, wherein:
an oil hole that allows the cancel oil to flow out is formed in an inner peripheral portion of the cancellation chamber defining member.

14. The speed change device according to claim 13, wherein:
the drum member includes a first clutch drum that defines the first engagement oil chamber together with the first piston, and a second clutch drum that is joined to the first clutch drum and that defines the second engagement oil chamber on a radially outer side with respect to the first engagement oil chamber together with the second piston;
the first clutch drum has the inner tubular portion, the cancellation chamber defining portion, a first outer tubular portion which extends in an axial direction on an outer side of the inner tubular portion and with which an outer peripheral portion of a first friction engagement plate is fitted, and a first annular wall portion formed integrally with the inner tubular portion and the first outer tubular portion so as to extend in a radial direction between the inner tubular portion and the first outer tubular portion; and the second clutch drum has a second inner tubular portion that supports the second piston, a second outer tubular portion which extends in the axial direction on an outer side of the second inner tubular portion and with which an outer peripheral portion of a second friction engagement plate is fitted, and a second annular wall portion formed integrally with the second inner tubular portion and the second outer tubular portion so as to extend in the radial direction between the second inner tubular portion and the second outer tubular portion.

15. The speed change device according to claim 14, wherein:

the drum member defines the second engagement oil chamber on a radially outer side with respect to the first engagement oil chamber together with the second piston;

the cancellation chamber defining portion of the drum member defines the second centrifugal hydraulic pressure cancellation chamber on the radially outer side with respect to the first centrifugal hydraulic pressure cancellation chamber together with the second piston; and the cancellation chamber oil passage of the drum member extends in a radial direction of the drum member.

16. The speed change device according to claim 1, wherein:

the first clutch includes a return spring disposed between the first piston and the cancellation chamber defining member; and a chamber diameter of the first centrifugal hydraulic pressure cancellation chamber is larger than a chamber diameter of the first engagement oil chamber.

17. The speed change device according to claim 16, wherein:

the drum member has a first annular wall portion that extends from the inner tubular portion toward a radially outer side;

the first piston has a tubular extended portion that extends in an axial direction toward the first annular wall portion, and a recessed circular columnar surface that extends toward an opposite side of the extended portion on a radially outer side with respect to an inner peripheral surface of the extended portion and that is in sliding contact with a seal member mounted to an outer peripheral portion of the cancellation chamber defining member;

the drum member has an annular recessed portion with which the extended portion of the first piston is fitted, and a circular columnar surface that defines the annular recessed portion and that is in sliding contact with the inner peripheral surface of the extended portion; and a seal member is disposed between the extended portion of the first piston and the circular columnar surface of the drum member.

18. The speed change device according to claim 17, wherein:

an oil hole that allows the cancel oil to flow out is formed in an inner peripheral portion of the cancellation chamber defining member.

19. The speed change device according to claim 18, wherein:

the drum member includes a first clutch drum that defines the first engagement oil chamber together with the first piston, and a second clutch drum that is joined to the first clutch drum and that defines the second engagement oil chamber on a radially outer side with respect to the first engagement oil chamber together with the second piston;

the first clutch drum has the inner tubular portion, the cancellation chamber defining portion, a first outer tubular portion which extends in an axial direction on an outer side of the inner tubular portion and with which an outer peripheral portion of a first friction engagement plate is fitted, and a first annular wall portion formed integrally with the inner tubular portion and the first outer tubular portion so as to extend in a radial direction between the inner tubular portion and the first outer tubular portion; and the second clutch drum has a second inner tubular portion that supports the second piston, a second outer tubular portion which extends in the axial direction on an outer side of the second inner tubular portion and with which an outer peripheral portion of a second friction engagement plate is fitted, and a second annular wall portion formed integrally with the second inner tubular portion and the second outer tubular portion so as to extend in the radial direction between the second inner tubular portion and the second outer tubular portion.

20. The speed change device according to claim 19, wherein:

the drum member defines the second engagement oil chamber on a radially outer side with respect to the first engagement oil chamber together with the second piston;

the cancellation chamber defining portion of the drum member defines the second centrifugal hydraulic pressure cancellation chamber on the radially outer side with respect to the first centrifugal hydraulic pressure cancellation chamber together with the second piston; and the cancellation chamber oil passage of the drum member extends in a radial direction of the drum member.

* * * * *